United States Patent
Saavedra

[15] 3,645,099
[45] Feb. 29, 1972

[54] BUOYANT OIL SLICK RETAINING STRUCTURE

[72] Inventor: Manuel Saavedra, San Pedro, Calif.
[73] Assignee: Roberto Aldana, San Pedro, Calif. a part interest
[22] Filed: Aug. 6, 1970
[21] Appl. No.: 61,727

[52] U.S. Cl. ..........................61/1 F, 210/242, 210/DIG. 21
[51] Int. Cl. .....................................E02b 3/04, E02b 15/04
[58] Field of Search..............61/1 F, 5; 210/83, 242, DIG. 21

[56] References Cited

UNITED STATES PATENTS

| | | | |
|---|---|---|---|
| 3,184,923 | 5/1965 | Galvaing | 61/1 |
| 3,537,587 | 11/1970 | Kain | 210/242 |
| 3,563,036 | 2/1971 | Smith et al. | 61/1 |
| 3,576,108 | 4/1971 | Rowland | 61/1 |

*Primary Examiner*—David J. Williamowsky
*Assistant Examiner*—David H. Corbin
*Attorney*—William C. Babcock

[57] ABSTRACT

A number of elongate rectangular panel structures that may be removably connected to one another in end-to-end relationship to be extended around an oil slick floating on the surface of a body of water to confine the slick. Each of the panel structures includes an elongate rectangular pliable sheet of double thickness that has two elongate longitudinally extending buoyant members disposed on opposite sides thereof and secured thereto at positions intermediate the top and bottom thereof. The buoyant members cause a substantial section of the sheet to extend above the body of water and serve as a barrier to confine the oil slick floating thereon.

Each of the panel structures has at least one intermediately disposed section that is of accordianlike structure that has a number of vertically disposed stiffeners included as a part thereof, which stiffeners serve to maintain the section in a substantially vertically disposed position when the section is floating on a body of water. The intermediate sections due to the accordianlike structure thereof, permit sheet sections on opposite sides thereof to shift vertically when subjected to wave action. Due to the above described construction of the panel sections, the panel structures not only tend to remain in a substantially vertical position when floating, but will not tip when subjected to wave action to the extent that oil from the slick may flow thereover. Stabilization of the panel structures when in a floating position is further attained by securing weights to the lower part of the portions thereof that are of accordianlike configuration.

7 Claims, 9 Drawing Figures

Patented Feb. 29, 1972

INVENTOR.
MANUEL SAAVEDRA
BY
William G. Babcock
ATTORNEY

Patented Feb. 29, 1972

INVENTOR.
MANUEL SAAVEDRA
BY
William R. Babcock
ATTORNEY

BUOYANT OIL SLICK RETAINING STRUCTURE

BACKGROUND OF THE INVENTION

1. Field of the Invention

A buoyant oil slick retaining device.

2. Description of the Prior Art

During the past few years, the accidental spillage of oil from vessels both in harbors and on the open sea has increased to an alarming degree. Various devices and means have been proposed and used to a limited extent in removing spilled oil, as well as attempting to retain slicks within a confined area. Devices such as floating booms that provide an endless wall have been used to encircle an oil slick in an endeavor to maintain the oil defining the slick within the confines of the boom. Such booms have proven to be of limited value, in that the members defining the same are not stable. The booms either move upwardly or downwardly with wave action, or tilt as a result thereof, and to the extent that the confined oil spills over the boom and is then free to contaminate adjacent areas.

The primary purpose in devising the present invention is to supply a sequence of elongate panel structures that are formed from a pliable material and may be folded into a compact configuration when not in use, but the panel structures when needed capable of being connected end to end to define a continuous vertical wall that extends around an oil slick floating on a body of water. The panel structures when so connected in end to end relationship remain in a substantially vertically extending stable position, and will not be deformed temporarily by wave action to the extent that oil defining a slick may escape into a harbor or the open sea.

SUMMARY OF THE INVENTION

A panel structure defined by an elongate rectangular sheet of pliable material of double thickness that has means on each end thereof for removably engaging the ends of adjacently disposed panels, and each panel including two oppositely disposed longitudinally extending buoyant members that are situated at intermediate positions between the top and bottom of the sheet. The buoyant members when floating on a body of water serve to support the sheet at such a position thereon that a substantial section of the sheet projects above the buoyant bodies to act as a barrier to prevent the escape of oil.

Each of the panel structures has at least one longitudinally extending intermediately positioned section thereof formed to define an accordionlike structure that is vertically reinforced by lightweight, substantially rigid strips, and the accordionlike section preferably having weights in the lower portion thereof that tend to maintain it and adjoining sections of the sheet material in vertically extending positions. Each section of the accordionlike structure serves the function of permitting independent vertical movement of the sections of the panel on each side thereof. As a result, when the panel structure is subjected to wave action, longitudinally extending portions thereof may move vertically without tilting, and the continuous wall defined by the panels remaining substantially vertical to confine the oil slick.

A major object of the present invention is to provide a sequence of pliable buoyant panel structures that may be connected end to end to define a continuous vertically extending wall that extends around an oil slick, and each of the panel structures including at least one intermediately positioned section of accordionlike structure that permits independent vertical movement of the sections of the panel structure on each side thereof, and the panel structure due to vertically extending reinforcing and weighting remaining in a substantially vertical position when floating on a body of water that is subjected to substantial wave action.

Another object of the invention is to supply a number of foldable panel structures that may be disposed in a compact position when not in use, but when required for use in confining an oil slick may be easily connected and disposed in a position to encircle the latter.

A still further object of the invention is to provide an oil slick confining panel structure that can be fabricated from standard commercially available materials, one that requires no elaborate plant facilities for its production, is easily cleaned and maintained, and one that when extended around a floating oil slick minimizes the hazards of the slick contaminating adjacent beaches, boats, ships and harbor installations.

DESCRIPTION OF THE PREFERRED EMBODIMENT

Figure 1:
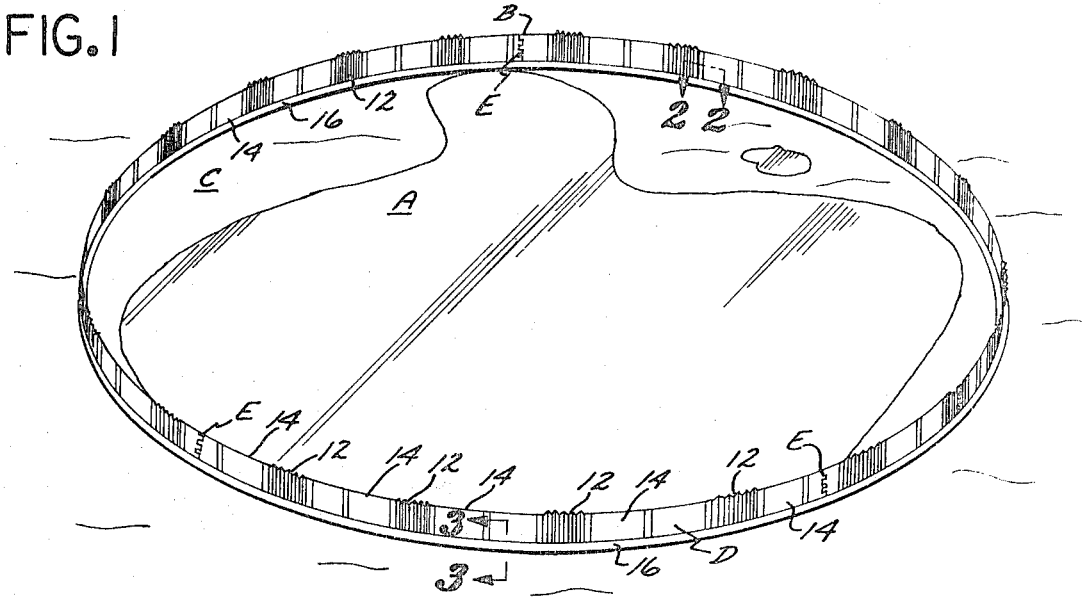
FIG. 1 is a perspective view of a number of the panel structures connected end to end and floating on a body of water to define a continuous vertically extending wall that serves to maintain an oil slick within the confines thereof.

An oil slick A is shown in FIG. 1 that is surrounded by an endless floating wall B that extends above the surface of the water C a substantial distance.

Figure 3:
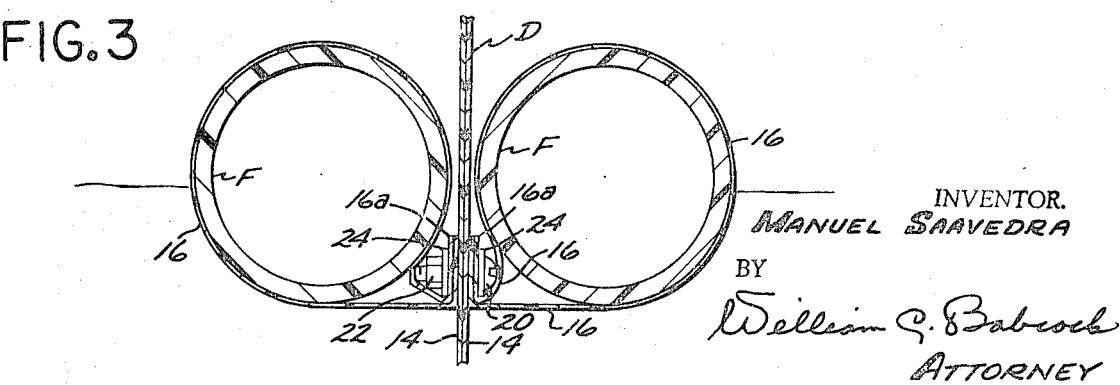
FIG. 3 is a vertical cross-sectional view of one of the panel structures taken on the line 3—3 of FIG. 1.
Figure 7:
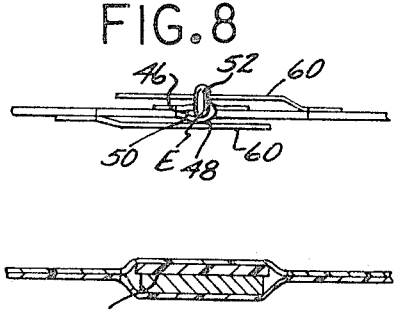
FIG. 7 is a vertically extending cross sectional view of the panel structures taken on the line 7—7 of FIG. 6.
Figure 8:
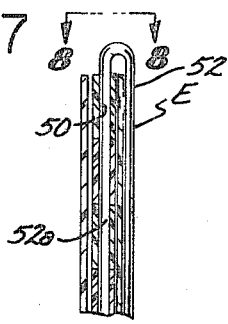
FIG. 8 is a top plan view of the adjoining ends of two of the panel structures illustrating the overlapping flaps that prevent the seepage of spilled oil at the end connections thereof.
Figure 6:
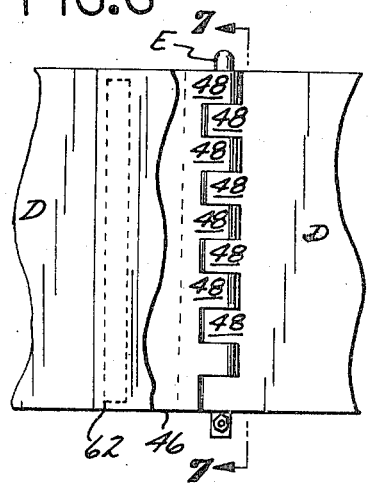
FIG. 6 is a fragmentary side elevational view of the adjoining ends of two panel structures and illustrating the means by which they are removably connected together.
Figure 9:
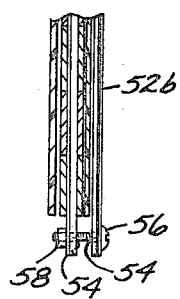
FIG. 9 is a fragmentary horizontal cross sectional view of a portion of the accordionlike structure and illustrates the positioning of a weight therein to maintain the structure in a vertical position when floating on a body of water.

Wall B is defined by a number of elongate rectangular panel structures D that may be removably connected end to end by means E that are shown in detail in FIGS. 6 to 8 inclusive. Each panel structure D is buoyantly supported by two longitudinally extending floats F as shown in FIG. 3 that are secured thereto. Also, each panel structure D includes a pliable rectangular sheet 10 of double thickness that has at least one intermediate section 12 thereof formed into an accordionlike configuration. Each section 12 is situated between two sections 14 of the sheet, with section 12 permitting independent upward and downward movement of the two sections 14 due to wave action.

The two sections 14 on each side of a section 12, have doubled over, longitudinal strips 16 of a pliable material secured thereto, and the doubled-over strips serving as elongate envelopes in which two cylindrical elongate floats F are disposed, which floats are preferably formed of plastic tubing that have closed ends. The free longitudinal end portions of each of the strips 16 are in abutting contact as shown in FIG. 3, to define tabs 16a as shown in FIG. 3, and these tabs and the sections 14 having transversely aligned openings (not shown) therein that are engaged by a bolt 20 as shown in FIG. 3 that has a nut 22 mounted thereon. The head of the bolt 20 and the nut 22 are in abutting contact with washers 24 mounted on the shank of the bolt. The washers 24 are in pressure contact with the tabs 16a, which tabs are forced into pressure contact with the portions of the section 14 situated therebetween.

Figure 4:
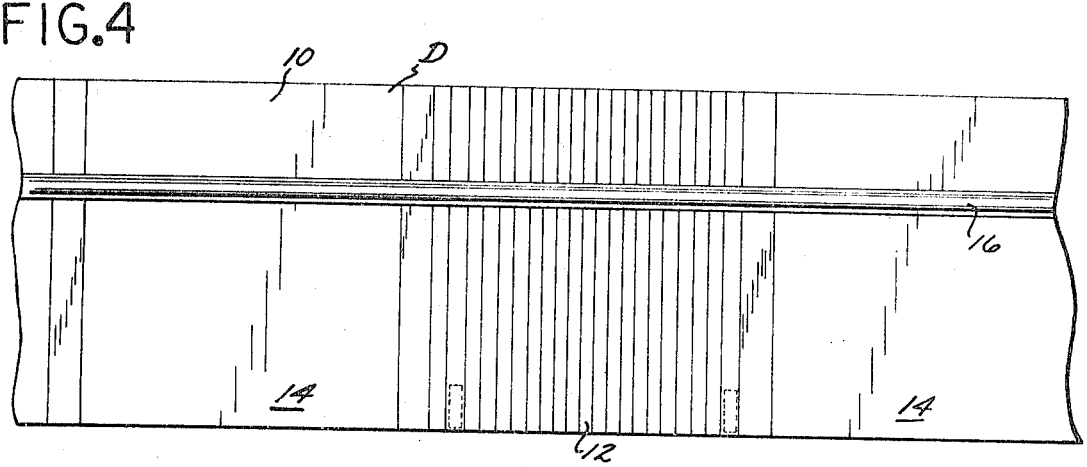
FIG. 4 is a side elevational view of a portion of one of the panel structures when floating in a calm body of water.
Figure 5:
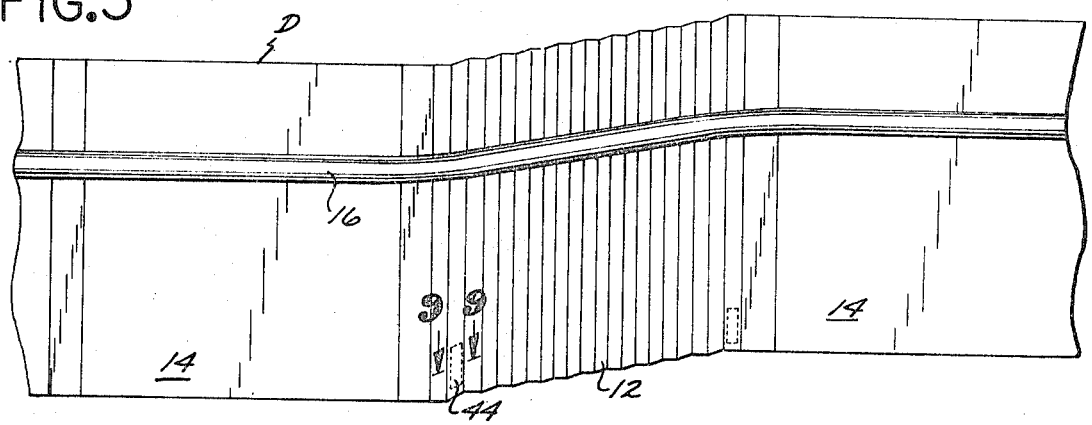
FIG. 5 is the same side elevational view as shown in FIG. 4, and illustrating the manner in which panel sections on each side of the section of accordionlike structure may move independently relative to one another to permit the panel structure to remain substantially vertical when subjected to wave action.

The envelopes are so located on the sections 14 that when the buoyant bodies F are supporting the panel structure D in the water, between one-third and one-fourth of the height of the panel structure is situated above the surface of the water C as shown in FIGS. 4 and 5, and serves as a barrier to prevent oil from the oil slick A flowing over the endless wall B and escaping from the confines thereof. The sheet 10 of double thickness is sewed along the edges thereof.

Figure 2:
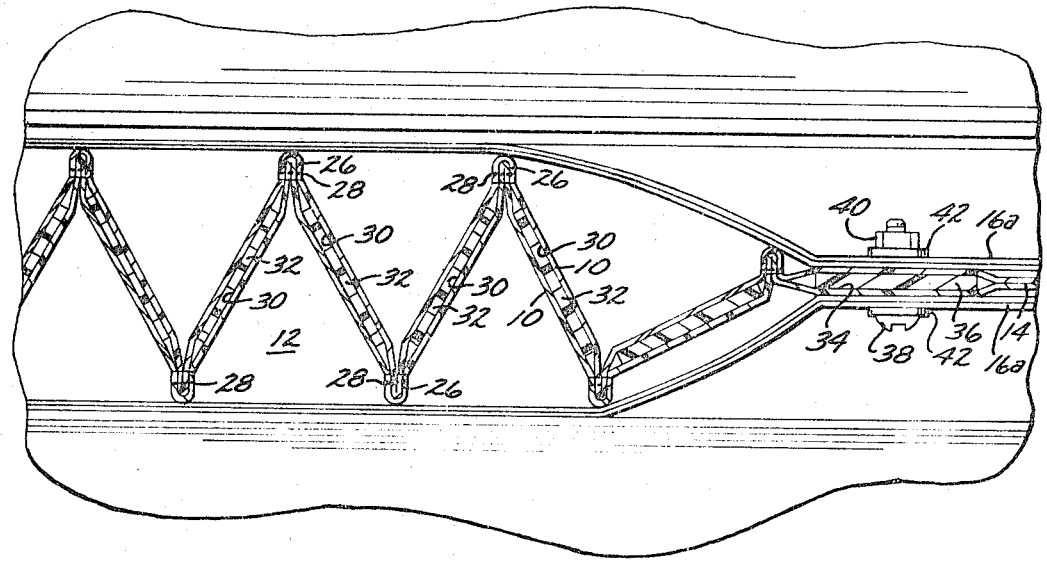
FIG. 2 is a fragmentary longitudinal cross sectional view of one of the panel structures taken on the line 2—2 of FIG. 1, illustrating the accordionlike structure that defines at least one of the sections therein.

Each accordionlike section 12, as can best be seen in FIG. 2, is defined by longitudinally spaced, vertically extending, double portions 26 of the sheet 10 that by stitching 28 are held in this configuration. The doubled over portions 26 in conjunction with the double walls of the sheet 10 cooperating to define vertically extending pockets 30 in which lightweight rigid reinforcing member 32 preferably formed from plastic are disposed. The doubled over portions 26 and the pockets 30 are arranged in the accordionlike configuration shown in FIG. 2. Each end of the section 12 has a pocket 34 defined therein as can be seen in FIG. 2 and in which pocket a vertically positioned reinforcing member 36 is situated, with the adjoining ends of the accordionlike section 12 and the sections 14 being connected by a number of vertically spaced bolts 38 that extend through transversely aligned openings (not shown) in tabs 16a, sections 14, and reinforcing member 36. The bolts 38 are engaged by nuts 40, and the nuts and bolts placing washers 42 into pressure contact with the tabs 16a as shown in FIG. 2.

The tabs 16a are not connected to the accordionlike section 12 as may be seen in FIG. 2, and as a result the sections 14 on each side of the section 12 may move independently in vertical directions relative to the accordionlike section 12 as shown in FIG. 5. As a result of the independent vertical movement of section 14 on each side of a section 12, the wall A may have portions thereof that assume the configuration shown in FIG. 5 due to wave action. This altering of the vertical positioning of the sections 14 occurs without any substantial tipping thereof. The sections 14 tend to maintain a vertical position in the water, even when subjected to wave action. To further maintain the sections 12 and 14 in a vertical position in the water, it is desirable to have weights 44 disposed in the lower portion of the pockets 30 as shown in FIG. 5.

The free longitudinal ends of each panel structure D as may best be seen in FIGS. 6 to 8 inclusive have the sheets 10 of double thickness by stitching 46 and cutting formed to define a number of loops 48. The loops 48 of one panel structure D are so arranged relative to those of the adjacently disposed panel D that the loops 48 on both panels interlock as shown in FIG. 6 and provide a vertically extending passage 50.

A hairpin shaped member 52 is provided that has one leg 52a extending downwardly through the passage, with the other leg 52b situated exteriorly of the loops as shown in FIG. 7 and 8.

The fastening member 52 is prevented from being inadvertently displaced from engagement with the loops by the legs 52a and 52b having transversely aligned bores 54 formed in the lower portion thereof that are engaged by a screw 56 that has a nut 58 mounted thereon. Each of the panel structures D at the adjacently disposed ends thereof have longitudinally extending flaps 60 of sheet material secured thereto by stitching 62 and the flap overlapping the loops 48 as shown in FIG. 8, to prevent any appreciable seepage of water through spaces that may exist at the junction of the loops 48. The sheet 10 may be of double thickness, due to two sheets of the same size being secured together by stitching, or if desired, a doubled-over sheet may be used to provide the two thicknesses.

The panel structure D when not in use will preferably be stored in a compact foldable configuration, and when it is desired to use the same, they will be connected end to end as shown in FIG. 1, the connected panel structures D are launched onto a body of water to surround an oil slick A floating thereon. When the oil slick has been removed from the confines of the endless wall defined by the panel structures D, the panel structures may be retrieved and uncoupled from one another. The separated panel structures are then stored until such time as they are again needed.

The operation of the panel structures when arranged in the configuration shown in FIG. 1 has been previously described in detail and need not be repeated.

I claim:

1. A buoyant elongate rectangular panel structure that may be removably secured to others of said panel structures to define a continuous wall to confine an oil slick within the interior thereof when said panel structures are floating on a body of water, said panel structure comprising:
   a. two elongate rectangular sheets of a pliable sheet material that are disposed back to back and so held by stitching to define a panel, said panel including at least one intermediate first section and two second sections on each side thereof, said first section by stitching having a plurality of transverse pockets defined therein, and said panel at the longitudinal free ends thereof being cut out and stitched to define a plurality of transversely spaced loops that are alignable with a plurality of loops on an adjacently disposed panel;
   b. a plurality of lightweight elongate reinforcing members disposed in said pockets;
   c. two doubled-over elongate strips intermediately disposed between the longitudinal edges of said second sections that are secured to said second sections only and hold the pocketed intermediate section containing said reinforcing members in an accordionlike configuration, said strips spanning said intermediate section and extending substantially the length of said panel, said strips disposed on opposite sides of said panel, and said strips closed on the longitudinal ends thereof;
   d. elongate float means within said doubled over strips, which doubled-over strips serve as envelopes to house said float means; and
   e. elongate rigid means for engaging transversely aligned passages defined by said loops for connecting said panels in end to end relationship to define said continuous wall, with said wall when floating on a body of water having the portions thereof above said float means projecting upwardly above the surface of said water to act as a barrier to prevent oil within the confines of said wall escaping outwardly therefrom, and said first section of said panel due to the accordion structure thereof allowing independent vertical movement of said second sections by wave action to at all times provide a barrier to prevent escape of oil from within said continuous wall.

2. A panel structure as defined in claim 1 in which free longitudinal edge portions of said strips are in abutting contact to define longitudinal tabs that are in contact with said second sections, and said structure in addition including:
   f. a number of rigid fastening members that secure said tabs to said second sections of said panels.

3. A panel structure as defined in claim 2 in which said fastening members are bolts that extend through aligned transverse openings in said second sections and tabs and nuts that engage said bolts.

4. A panel structure as defined in claim 1 which in addition includes:
   f. weight means on at least the lower portion of said first section that tend to maintain said panel in a vertical floating position.

5. A panel structure as defined in claim 1 which in addition includes:
   f. first means on the longitudinal end of said panel that tend to prevent any escape of oil through spaces defined by said loops.

6. A panel structure as defined in claim 5 in which said first means are transversely positioned, longitudinally extending flaps stitched to said second sections.

7. A panel structure as defined in claim 1 in which said pockets in said first section are separated by doubled over stitched portions of said first section.